US010279916B2

(12) United States Patent
Kinard et al.

(10) Patent No.: US 10,279,916 B2
(45) Date of Patent: May 7, 2019

(54) CENTER CONSOLE SIDE OPENING DOORS AND INTEGRATED ARMREST COCKTAIL TRAY

(71) Applicant: Safran Seats USA LLC, Gainesville, TX (US)

(72) Inventors: Marc W. Kinard, Corinth, TX (US); Ty Parker, Sanger, TX (US); Raul G. Reyes, Denton, TX (US); John D. Allen, Sanger, TX (US)

(73) Assignee: Safran Seats USA LLC, Gainesville, TX (US)

( * ) Notice: Subject to any disclaimer, the term of this patent is extended or adjusted under 35 U.S.C. 154(b) by 149 days.

(21) Appl. No.: 15/128,135

(22) PCT Filed: Apr. 2, 2015

(86) PCT No.: PCT/US2015/024115
§ 371 (c)(1),
(2) Date: Sep. 22, 2016

(87) PCT Pub. No.: WO2015/153898
PCT Pub. Date: Oct. 8, 2015

(65) Prior Publication Data
US 2017/0088268 A1    Mar. 30, 2017

Related U.S. Application Data

(60) Provisional application No. 61/974,496, filed on Apr. 3, 2014, provisional application No. 61/974,476, filed on Apr. 3, 2014.

(51) Int. Cl.
*A47B 39/00*    (2006.01)
*B64D 11/06*    (2006.01)

(52) U.S. Cl.
CPC ...... *B64D 11/0638* (2014.12); *B64D 11/0644* (2014.12); *B64D 11/0646* (2014.12); *Y02T 50/46* (2013.01)

(58) Field of Classification Search
CPC ...... B64D 11/0638; B60N 2/793; B60N 2/79; B60N 2/777; A47B 3/00; A47B 5/006;
(Continued)

(56) References Cited

U.S. PATENT DOCUMENTS 3,583,760 A * 6/1971 McGregor ............. A47B 5/006
297/145
4,159,071 A * 6/1979 Roca ....................... A47C 7/70
108/42

(Continued)

FOREIGN PATENT DOCUMENTS

GB        2468565       9/2010
WO     2015153898     10/2015

OTHER PUBLICATIONS

International Patent Application No. PCT/US2015/024115, Search Report and Written Opinion dated Jun. 10, 2015.

*Primary Examiner* — Chi Q Nguyen
(74) *Attorney, Agent, or Firm* — Kilpatrick Townsend & Stockton LLP; Dean W. Russell; Melissa L. Love (57) ABSTRACT

Passenger seat armrests and consoles have laterally translating armrest doors that open and close to allow for deployment and stowage of tray tables. The armrest doors may be guided through their translation by slides or a linkage that controls their motion. The armrest doors may also translate in two-dimensions, incorporating a vertical translation as well as a lateral translation. The resulting motion allows for better placement of the deployable tray tables within the armrest or console and a reduction in wasted space. The passenger seat armrests may also incorporate cocktail trays (Continued)

that can be integrated into the armrest doors or the armrest or console itself.

18 Claims, 11 Drawing Sheets

(58) Field of Classification Search
CPC .......... A47C 7/70; A47C 7/68; A61G 5/1094; A61G 5/125
USPC ............ 297/145, 188.18, 188.19; 296/24.43, 296/37.8
See application file for complete search history.

(56) References Cited

U.S. PATENT DOCUMENTS

| | | | |
|---|---|---|---|
| 4,809,897 A * | 3/1989 | Wright, Jr. .............. | B60N 3/101 220/521 |
| 4,944,552 A * | 7/1990 | Harris ...................... | A47C 7/70 297/145 |
| 5,232,190 A | 8/1993 | Gould | |
| 5,372,403 A * | 12/1994 | Puerto ...................... | A47C 1/03 297/145 |
| 5,547,247 A * | 8/1996 | Dixon ...................... | A47C 7/70 297/145 |
| 5,547,248 A * | 8/1996 | Marechal ................. | B60N 2/79 297/188.17 |
| 5,845,888 A * | 12/1998 | Anderson ............... | B60N 3/102 248/311.2 |
| 6,032,587 A * | 3/2000 | Salenbauch ........... | B60N 3/002 108/44 |
| 6,347,590 B1 * | 2/2002 | D'Annunzio .......... | B60N 3/002 108/25 |
| 6,793,285 B1 * | 9/2004 | Tame .................... | B60N 2/3011 297/336 |
| 7,064,285 B2 * | 6/2006 | Ichimaru ............... | E05F 1/1066 200/293 |
| 7,172,232 B2 * | 2/2007 | Chiku ...................... | B60R 7/04 296/24.34 |
| 7,874,614 B2 * | 1/2011 | Figueras Mitjans ..... | A47C 7/70 297/145 |
| 8,596,206 B2 * | 12/2013 | Legeay .................. | B60N 3/002 108/137 |
| 2003/0085245 A1 | 5/2003 | Chiku | |
| 2007/0069544 A1 * | 3/2007 | Sturt ...................... | B60N 2/793 296/37.8 |
| 2008/0035657 A1 * | 2/2008 | Yamashita ................ | B60R 7/04 220/826 |
| 2009/0079228 A1 | 3/2009 | Sturt et al. | |
| 2009/0224564 A1 * | 9/2009 | O'Brien ................. | B60N 3/102 296/37.8 |
| 2010/0244478 A1 | 9/2010 | Depue | |
| 2010/0314896 A1 | 12/2010 | Skibinski et al. | |
| 2011/0227359 A1 * | 9/2011 | Fesenmyer ........... | B60N 3/101 296/24.34 |

* cited by examiner

CENTER CONSOLE SIDE OPENING DOORS AND INTEGRATED ARMREST COCKTAIL TRAY

CROSS REFERENCE TO RELATED APPLICATIONS

This application is the U.S. national phase entry of International Patent Application Serial No. PCT/US2015/024115 ("the '115 application"), filed on Apr. 2, 2015, which application is related to and claims priority benefits from U.S. Provisional Application Serial No. 61/974,496 ("the '496 application"), filed on Apr. 3, 2014, entitled Center Console with Side Opening Doors, and U.S. Provisional Application Serial No. 61/974,476 ("the '476 application"), filed on Apr. 3, 2014, entitled Center Console Armrest Doors with Integrated Cocktail Trays. The '115, '496, and '476 applications are hereby incorporated in their entireties by this reference.

FIELD OF THE INVENTION

The field of the invention relates to passenger seats or the like, and more particularly to tray tables and console doors for use with passenger seats.

BACKGROUND

Many passenger seats such as those on passenger aircraft, buses, trains, and the like are designed to incorporate trays to allow a passenger to rest a drink, meal, computer, or other items during travel. In some instances, a tray table may be stowed in the passenger seat armrest or console and be deployable for use by a passenger. The tray table is deployed by the passenger to provide a relatively flat surface for eating, working, recreation, or other uses.

In order to save space, many tray tables and cocktail trays are mounted on articulating or rotating arms that allow them to be stowed in the armrest or console of the passenger seat. An armrest or console door is generally used to cover the tray table or cocktail tray when it is stowed and to close the space in the armrest or console when the tray table or cocktail tray is deployed. The door is generally hinged on the side of the armrest or console that is farther away from the passenger to allow the door to pivot up and away from the passenger so he or she may deploy the tray table. In some instances, a tray table and a cocktail table may both be present on the passenger seat.

Conventional deployable tray table designs with hinged doors that pivot up and away from the passenger suffer from a number of disadvantages. The hinge for the door, which is often concealed within the passenger seat arm or console, provides an obstruction to the deployable tray table that compromises its stowed position and its movement into and out of the console or armrest. The presence of the door hinge pushes the deployable table closer to the center of the seat, resulting in wasted space inside the console or armrest. In addition to the obstruction caused by the hinge, the movement of the door during deployment or stowage of the tray table can be problematic. Because the door pivots up, it can impede on the movement of the tray table as it is being deployed. Oftentimes a passenger is required to open the door, partially deploy the tray table, close the door, and then finish deploying the tray table. In other words, the movement of the tray table is not wholly separate from the movement of the door during deployment or stowage.

Many conventional tray table designs also include a separate, moveable cocktail tray to hold drinks or other small items separately from the main tray table. The cocktail tray generally requires additional mechanisms to rotate or pivot the tray into and out of position, increasing the complexity, cost, and weight of the passenger seat. Also, the presence of a cocktail tray in addition to a tray table can result in compromised packaging and/or design of the cocktail tray and/or tray table.

Recently, there has been a movement in the carrier industries to provide more stowage space for personal items, especially personal electronics devices like cellular phones, tablet computers, or laptop computers. As a result, there is movement among common carriers to reduce wasted space and increase storage options. In particular, the elimination of unused space in the passenger seat armrest and console can provide opportunities for new storage areas or increased passenger space.

The present invention discloses, among other things, a console or armrest door that opens laterally or to the side with an optional integrated cocktail tray. A side opening door offers a number of advantages over the traditional console or armrest doors that pivot up on a hinge. First, since the side opening door opens away from the outer edge of the console or armrest, relative to the passenger, the tray may be stowed and deployed in a position further outboard than is possible with a traditional console or armrest door. The tray can be moved into a space that was previously unoccupied and open up space in the armrest or console that is closer to the passenger. This newly opened space closer to the passenger can be converted into a console or armrest pocket to provide storage options for the passenger. In particular, this new console or armrest storage pocket may be ideally suited to the storage of personal electronic devices, such as cellular phones, tablet computers, laptop computers, or the like. Alternatively, this extra space could be utilized to provide additional hip room for increased passenger comfort.

A side opening console or armrest door also simplifies the deployment and stowage of the tray table for a passenger. Unlike pivoting doors that open upwards, the side opening door provides enhanced clearance to allow a passenger to fully deploy the tray table while the console or armrest door is in the open position.

Thus, in some instances it may be desirable to provide a cocktail tray that is integrated into the armrest or console doors. An integrated cocktail tray may reduce weight, complexity, and prevent interference between two deploying trays and tray deployment mechanisms on a single passenger seat. Also, a cocktail tray integrated into an armrest or console door does need to be deployed or stowed, so it is always available to the passenger. This is especially useful for passenger aircraft, where most trays must be stowed during taxi, takeoff, and landing.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a passenger seat may comprise an armrest or console with an armrest door and an armrest door opening mechanism. The armrest door opening mechanism may guide the armrest door through a lateral translation.

In some embodiments, the armrest door opening mechanism comprises a slide.

In certain embodiments, the armrest door opening mechanism may also guide the armrest door through a vertical translation.

In some embodiments, the armrest door opening mechanism may comprise a parallelogram linkage.

In some embodiments, the armrest door opening mechanism may comprise a spring.

In certain embodiments, the armrest door opening mechanism may comprise a spring loaded release mechanism.

In some embodiments, the armrest door opening mechanism may comprise a damper.

In certain embodiments, the armrest door opening mechanism may comprise an electric actuator.

In some embodiments, the passenger seat may comprise an integrated cocktail tray. The integrated cocktail tray may comprise a cocktail tray depression and a cocktail tray lip.

In some embodiments, the armrest door may comprise an integrated cocktail tray. The integrated cocktail tray may comprise a cocktail tray depression and a cocktail tray lip.

In certain embodiments, the armrest door may comprise a finger aperture.

According to certain embodiments of the present invention, an armrest or console may comprise an armrest door and an armrest door opening mechanism. The armrest door opening mechanism may guide the armrest door through a lateral translation.

In certain embodiments, the armrest door opening mechanism may comprise a slide.

In certain embodiments, the armrest door opening mechanism may also guide the armrest door through a vertical translation.

In some embodiments, the armrest door opening mechanism may comprise a parallelogram linkage.

In some embodiments, the armrest door opening mechanism may comprise a spring.

In certain embodiments, the armrest door may comprise a finger aperture.

In some embodiments, the armrest door opening mechanism may comprise an electric actuator.

In some embodiments, the armrest or console may comprise an integrated cocktail tray. The integrated cocktail tray may comprise a cocktail tray depression and a cocktail tray lip.

In certain embodiments, the armrest door may comprise an integrated cocktail tray. The integrated cocktail tray may comprise a cocktail tray depression and a cocktail tray lip.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide an armrest or console with a laterally translating armrest door and an optional integrated cocktail tray for passenger seats. While the armrest door and integrated cocktail tray are discussed for use with aircraft seats, they are by no means so limited. Rather, embodiments of the armrest door and integrated cocktail tray may be used in passenger seats or other seats of any type or otherwise as desired.

In some embodiments of the present invention, as shown in FIGS. 1-4, an armrest or console 1 comprises an integrated cocktail tray 100 which is integrated into the armrest or console 1 or an armrest door 200. The integrated cocktail tray 100 may have a cocktail tray depression 102 and a cocktail tray lip 104 that are configured to provide a retaining surface for a drinking glass or other small items. The integrated cocktail tray 100 may comprise a part of the armrest door 200, the armrest or console 1, or be constructed as its own individual part, either moveable or stationary. The integrated cocktail tray 100 may also have a finger slot 202 to allow a passenger to grip and move the integrated cocktail tray 100, particularly when the integrated cocktail tray 100 is formed as part of the armrest door 200. The finger slot 202 of the integrated cocktail tray 100 can be used to open and close the armrest door 200 to facilitate the stowage or deployment of a tray table 300. A knuckle cut out 204 may also be included with the integrated cocktail tray 100 to provide clearance for a tray knuckle 302 that forms part of the articulation mechanism for the tray table 300.

The integrated cocktail tray 100 may take on any number of shapes including, but not limited to, a rectangle, oval, circle, square, or any other shape as desired or required for functional or aesthetic purposes. Furthermore, the cocktail tray depression 102 may be sloped or flat with respect to either the passenger compartment floor or the upper surface of the armrest door 200. The integrated cocktail tray 100 may also have a cocktail tray lip 104 that extends forward in addition to the aft and side lip as illustrated. To form the integrated cocktail tray 100, the cocktail tray depression 102 may be a surface that is lower than the top surface of the armrest door 200, or, alternatively, the top surface of the armrest door 200 may be curved, extended, or otherwise raised to create the cocktail tray depression 102 and cocktail tray lip 104.

In certain embodiments, the integrated cocktail tray 100 may take on a number of variations or additional features as necessary to meet the requirements of a particular application. For example, the cocktail tray depression 102 or cocktail tray lip 104 may incorporate a coating or other method for achieving a high grip surface. A rubber coating, soft touch paint, or other friction enhancing coating may be applied to the cocktail tray depression 102 or cocktail tray lip 104 to improve retention of small items. The integrated cocktail tray 100 may also incorporate patterned or roughened finishes to enhance grip and frictional properties. In some embodiments, the integrated cocktail tray 100 may also incorporate other locking mechanisms to hold or retain items. Magnets, slots, hook and loop fasteners, and/or other fixtures may be used, particularly with a cup or other device with a complementary locking mechanism.

Figure 1:
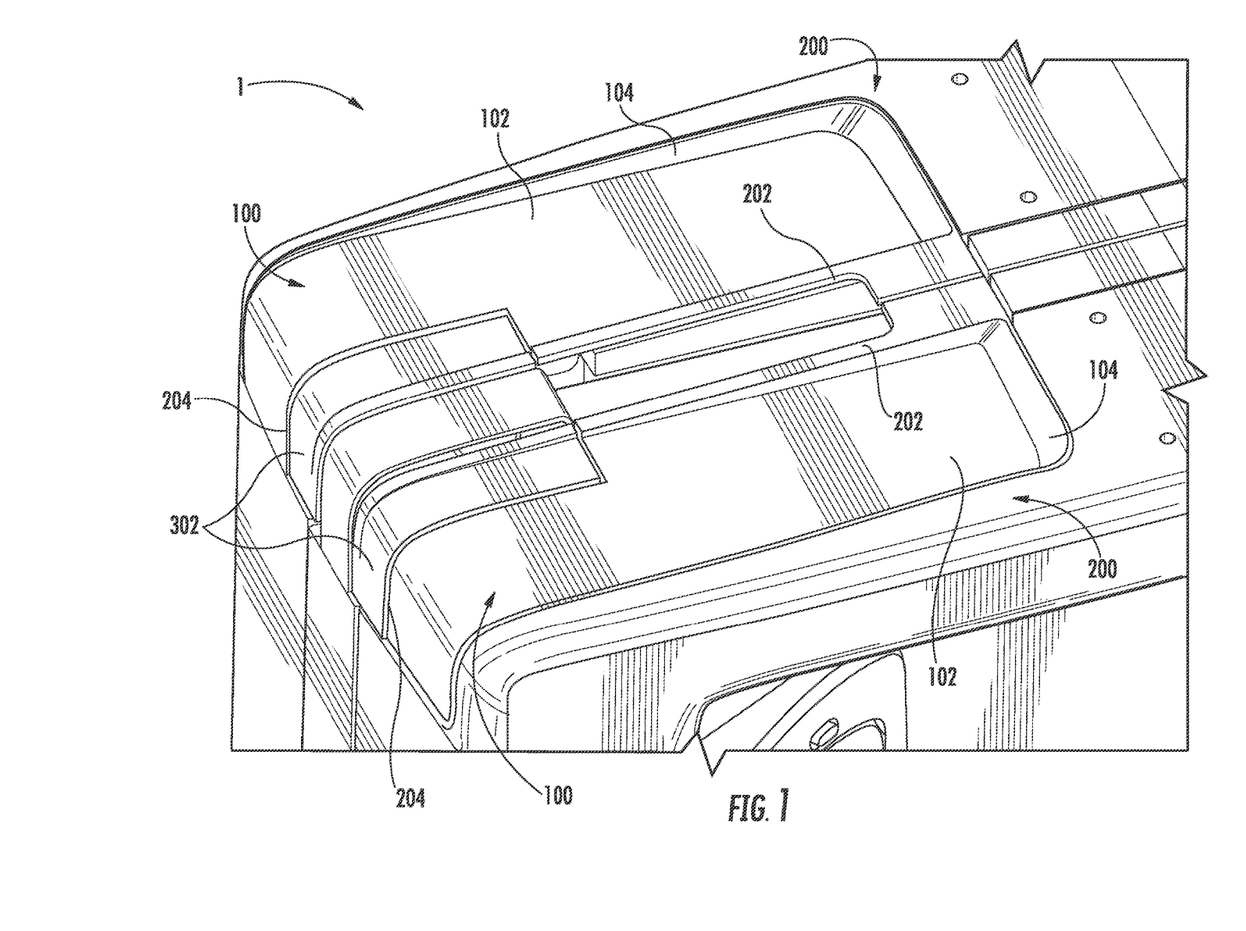
FIG. 1 is a perspective view of a console or armrest with integrated cocktail trays, according to certain embodiments of the present invention.
Figure 2:
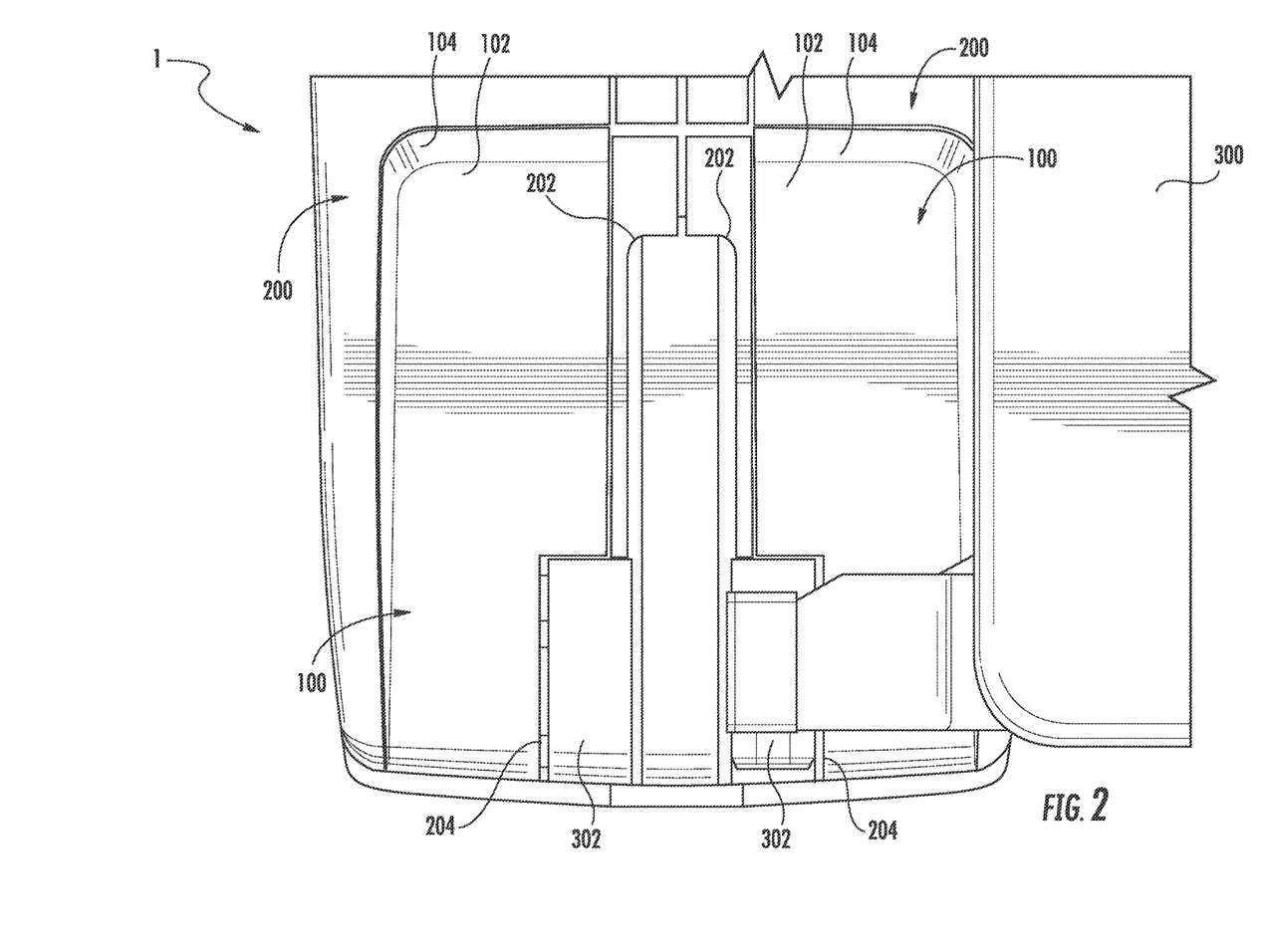
FIG. 2 is plan view of a console or armrest with integrated cocktail trays and a deployed tray table, according to certain embodiments of the present invention.
Figure 3:
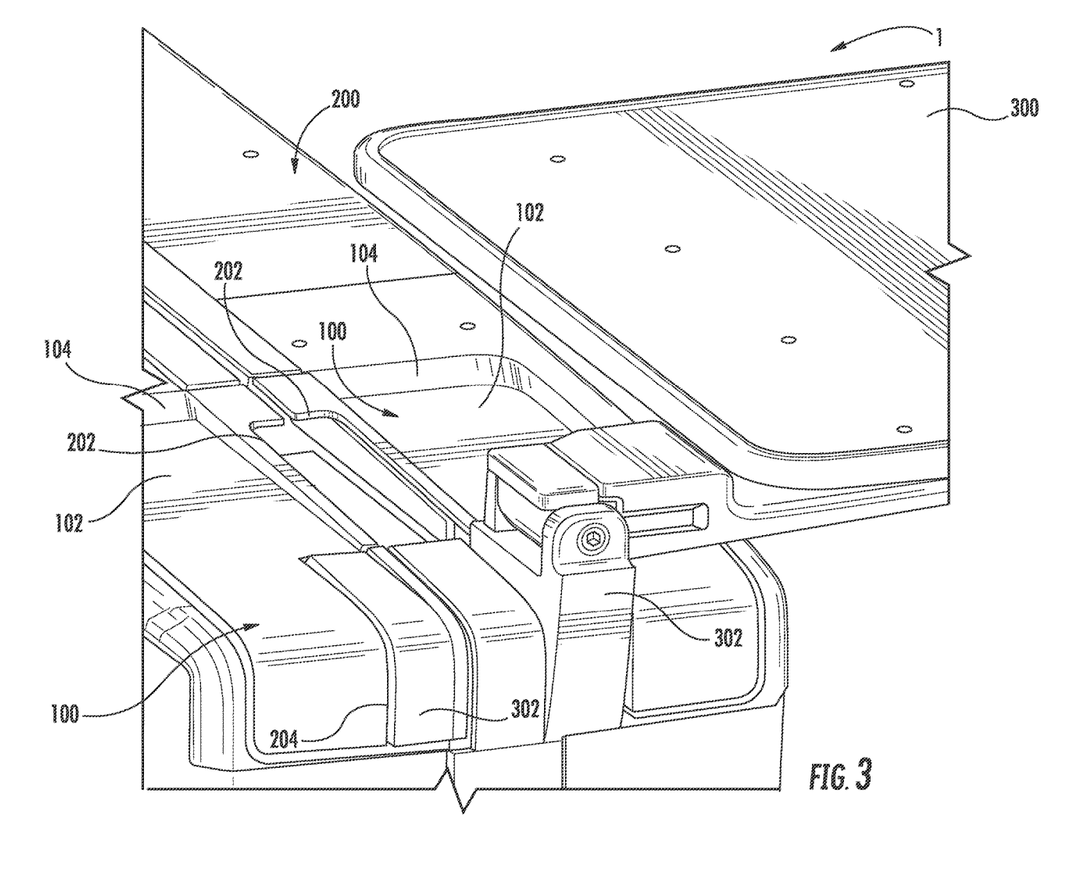
FIG. 3 is a perspective view of a console or armrest with integrated cocktail trays and a deployed tray table, according to certain embodiments of the present invention.
Figure 4:
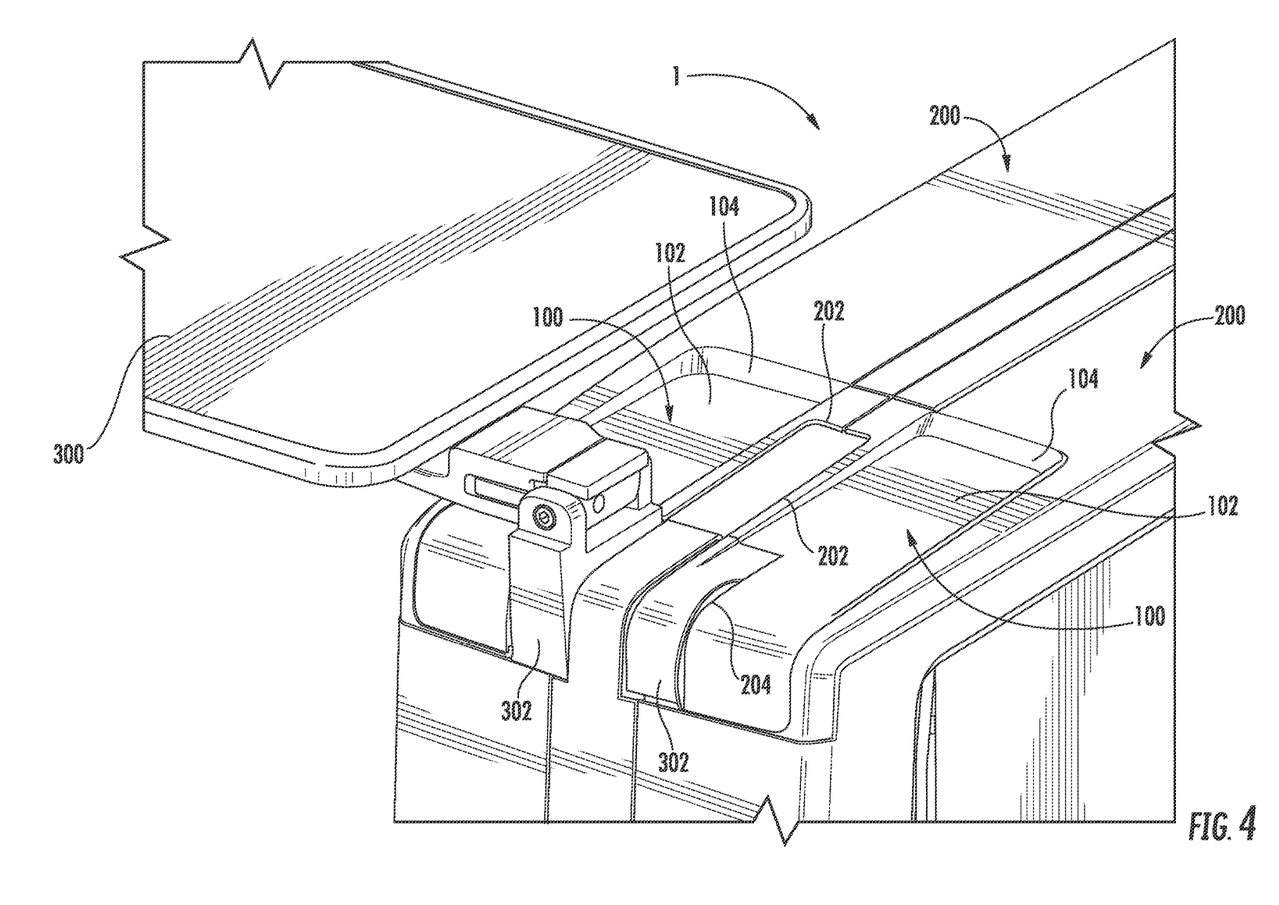
FIG. 4 is a perspective view of a console or armrest with integrated cocktail trays and a deployed tray table, according to certain embodiments of the present invention.
Figure 5:
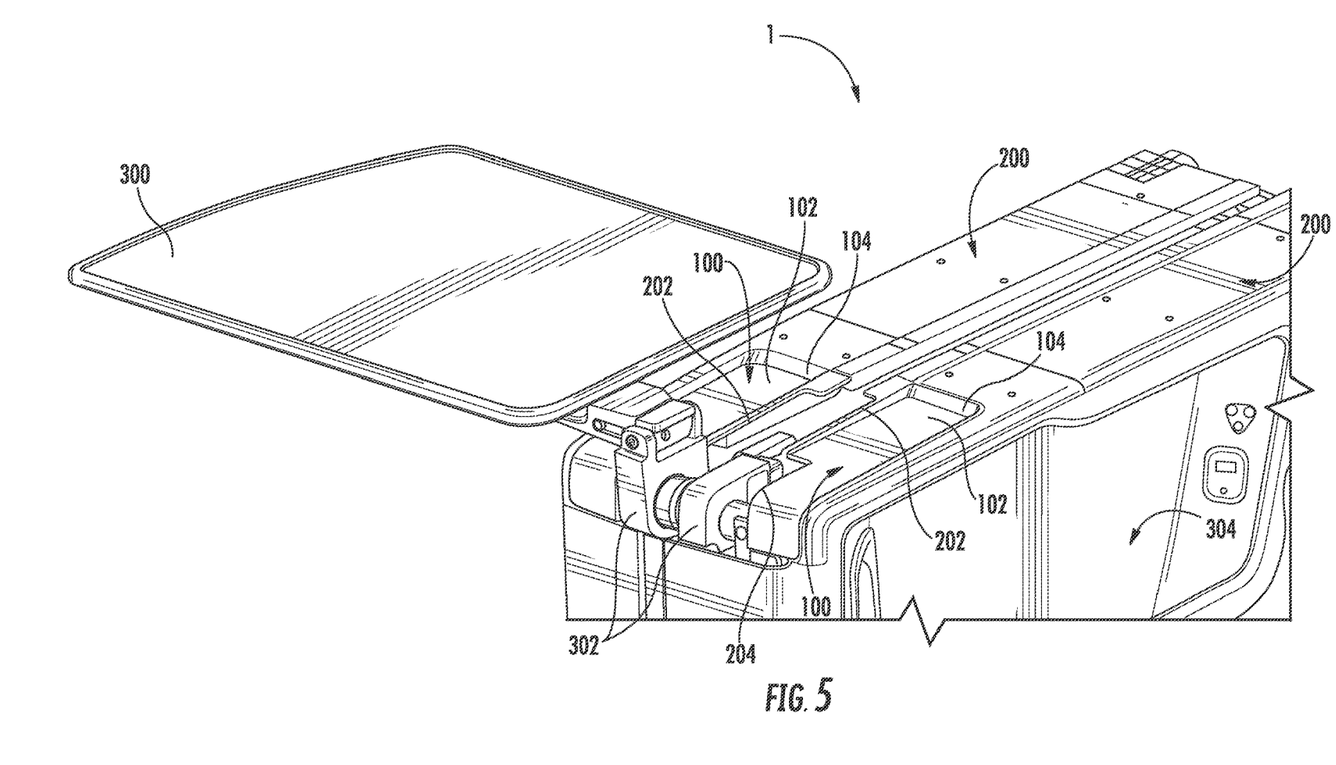
FIG. 5 is a perspective view of a console or armrest with integrated cocktail trays, a deployed tray table, and an armrest door in a partially open position, according to certain embodiments of the present invention.

Still referring to FIGS. 1-4, the integrated cocktail tray 100 should be positioned or otherwise configured to work in conjunction with a tray table 300 when it is in the deployed position, as shown in FIG. 2. The passenger should have access to, and the ability to retain small items in, the integrated cocktail tray 100 while the tray table 300 is also in use. In some embodiments, the integrated cocktail tray 100 will always be available to the passenger and does not need to be put in a stowed position. The fact that the integrated cocktail tray 100 is always exposed or in a position for use is particularly useful for use on air carriers where most trays must be stowed during taxi, takeoff, and landing procedures.

In some embodiments of the present invention, as shown in FIGS. 5-9, an armrest or console 1 may comprise one or more armrest doors 200 with integrated cocktail trays 100. Each integrated cocktail tray 100 may comprise a cocktail tray depression 102 and a cocktail tray lip 104. In FIGS. 5-9, one of the armrest doors 200 is shown in an open position, while the other armrest door 200 is shown in a closed position. Each armrest door 200 may include a finger slot 202 to allow a passenger to grip and move the armrest door 200, and a knuckle cut out 204 to provide clearance for a tray knuckle 302 that is part of the articulation mechanism for a tray table 300. In certain embodiments, the finger slot 202 and/or knuckle cut out 204 may comprise spring-loaded doors to cover any openings for aesthetic purposes or to eliminate pinch points.

Still referring to FIGS. 5-9, the armrest door 200 is mounted on an armrest door opening mechanism (not shown) that guides or moves the armrest door 200 through a lateral translation to an open position. The lateral translation of the armrest door 200 into an open position provides clearance for a tray table 300 to move from a deployed position to a stowed position and vice versa. The lateral motion of the armrest door 200 away from the center of the armrest or console 1 and towards the passenger (not shown) eliminates the hinge that would normally be associated with a pivoting armrest door and provides clearance for the tray table 300 to be deployed through a space closer to the center of the armrest or console 1. As a result, the tray table 300 may be moved into a position closer towards the center of the armrest or console 1 and away from the seating location of the passenger. Relocating the tray table away from the passenger seating position allows space traditionally occupied by the tray table 300 in its stowed position within the armrest or console 1 to be repurposed for a storage pocket 304, or alternatively for additional passenger hip room.

Figure 6:
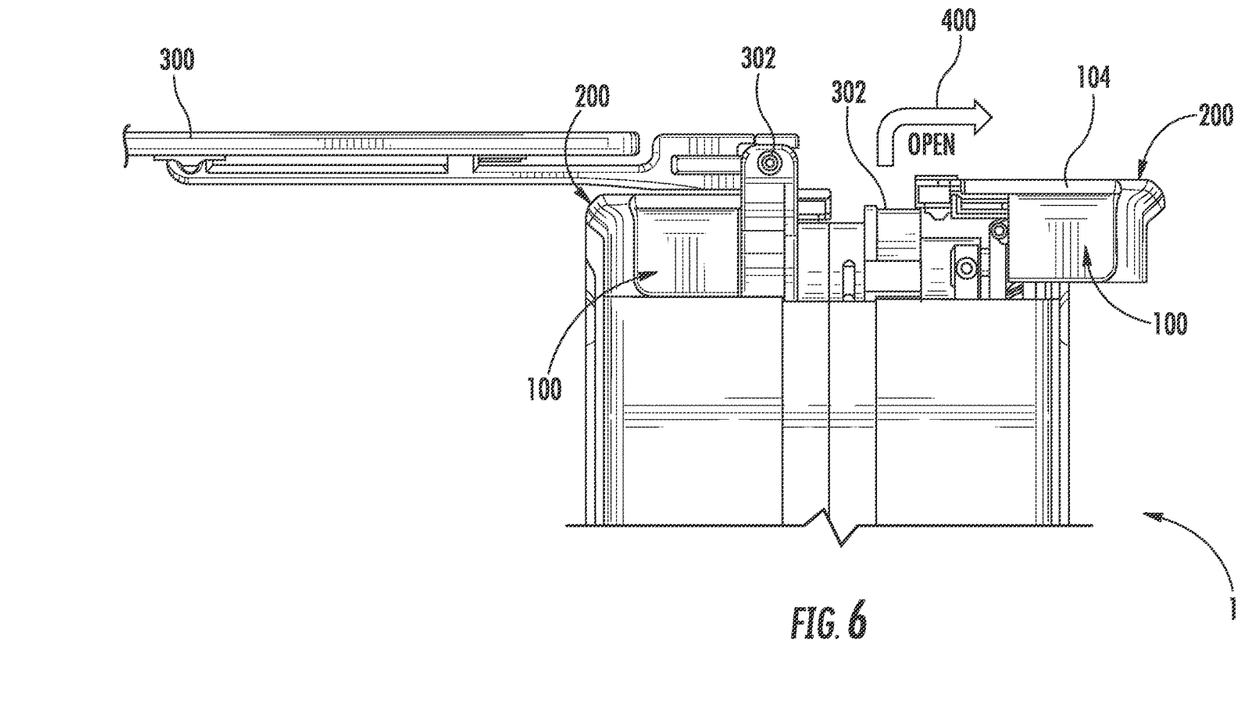
FIG. 6 is a front elevation view of console or armrest with a deployed tray table and an armrest door in an open position, according to certain embodiments of the present invention.
Figure 7:
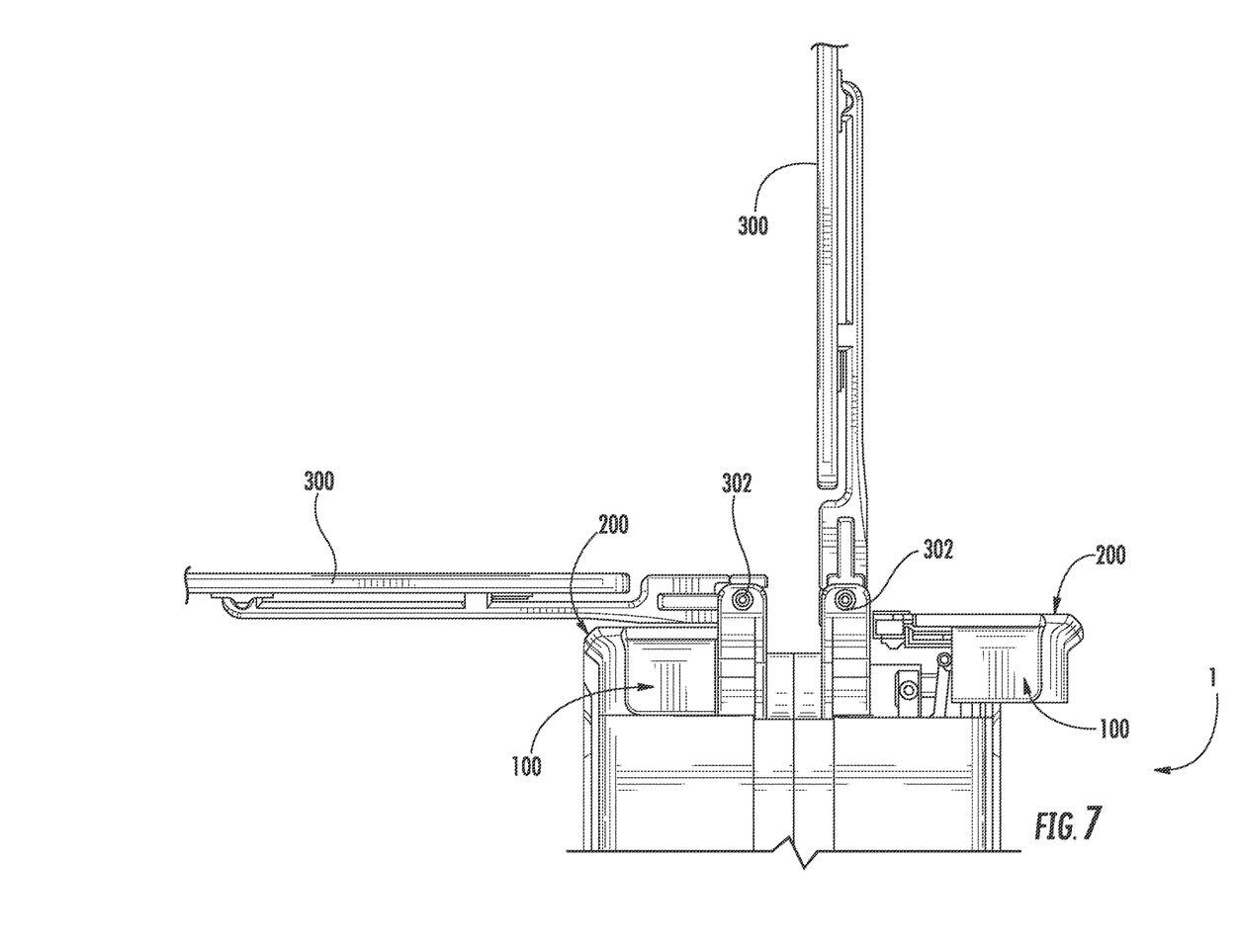
FIG. 7 is a front elevation view of a console or armrest with two deployed tray tables and an armrest door in an open position, according to certain embodiments of the present invention.
Figure 8:
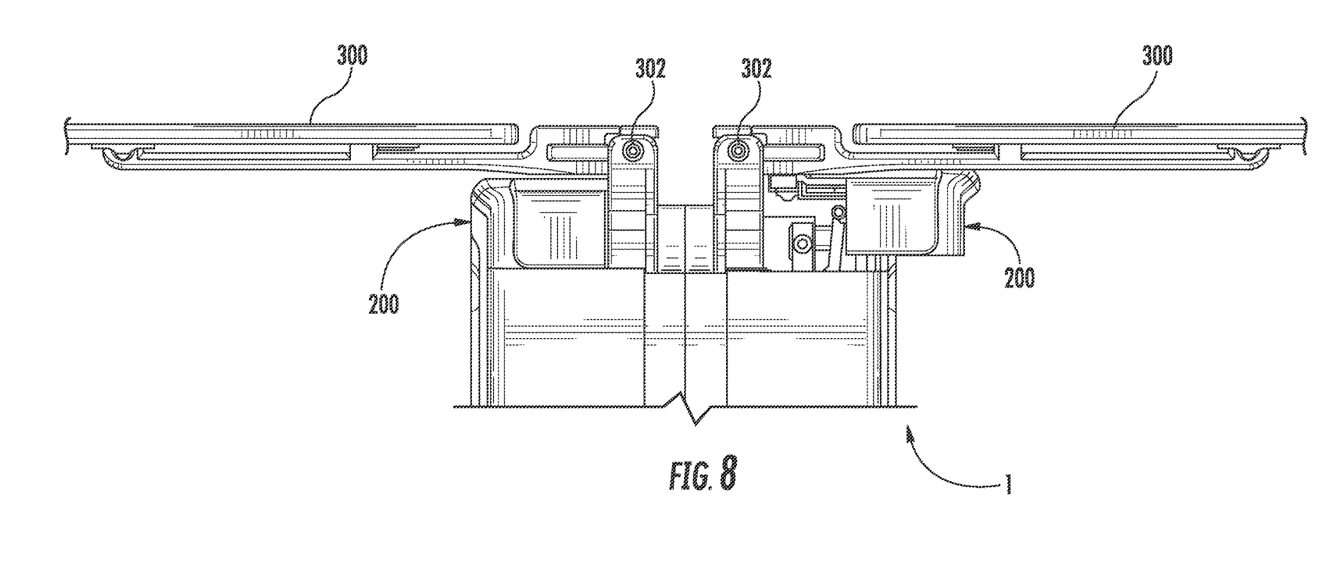
FIG. 8 is a front elevation view of a console or armrest with two deployed tray tables and an armrest door in an open position, according to certain embodiments of the present invention.
Figure 9:
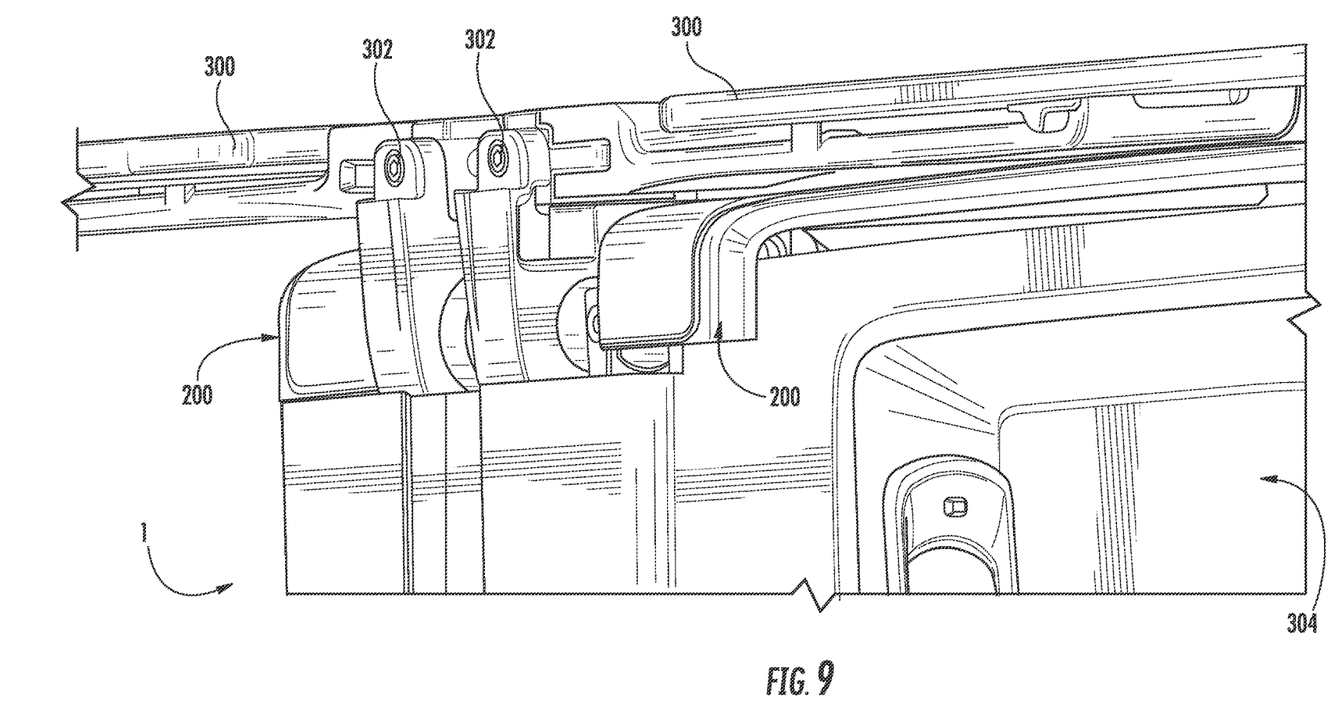
FIG. 9 is a perspective view of a console or armrest with two deployed tray tables and an armrest door in an open position, according to certain embodiments of the present invention.

FIGS. 6-8 show the motion of the tray table 300 from a stowed position to a deployed position while the armrest door 200 is in an open position. FIG. 6 shows the armrest or console 1 with one tray table 300 deployed and another in a stowed position. The armrest door 200 corresponding to the stowed tray table has translated laterally into an open position as shown by the motion arrow 400. In some embodiments of the present invention, the armrest door 200 may translate vertically as well as laterally as it moves from a closed position to an open position or vice versa. In FIG. 7, the previously stowed tray table 300 has been moved up through the space opened up by the lateral translation of the armrest door 200. The tray table 300 is now in a vertical position and is partially deployed. FIG. 8 shows the tray table 300 in a fully deployed position while the armrest door 200 is still in an open position. Because of the lateral translation of the armrest door 200, the tray table 300 may move throughout its entire range of motion from a stowed position to a deployed position without impinging on the armrest door 200. The full range of motion of the tray table 300 is possible because, among other things, of the clearance between the armrest door 200 and tray table 300 in the deployed position as shown in FIGS. 8 and 9. The lateral translation of the armrest door 200 is at least partially responsible for providing adequate clearance to allow the tray table 300 to move throughout its full range of motion while the armrest door 200 is in the open position.

Figure 10:
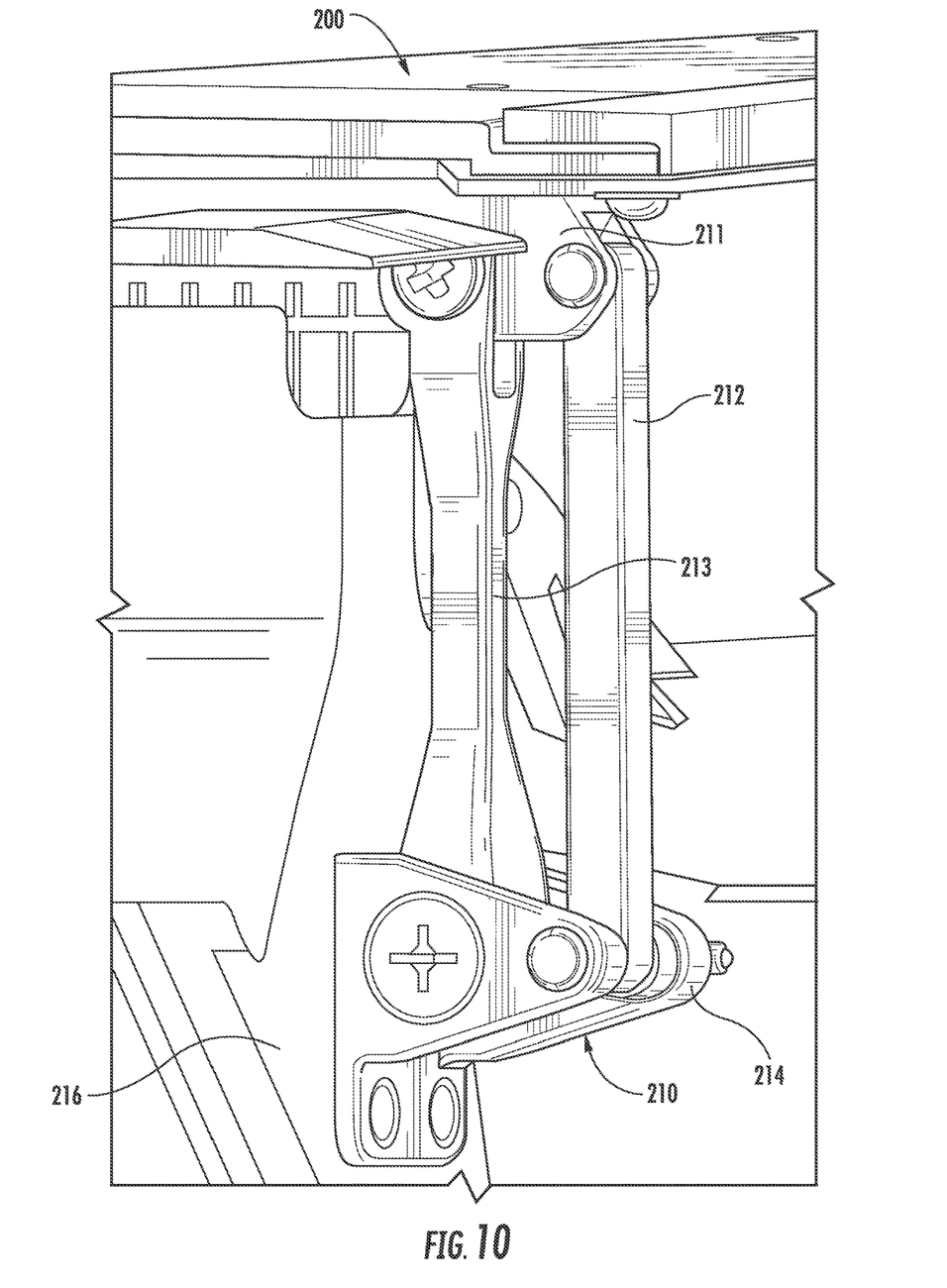
FIG. 10 is a perspective view of an armrest opening mechanism in an open position, according to certain embodiments of the present invention.
Figure 11:
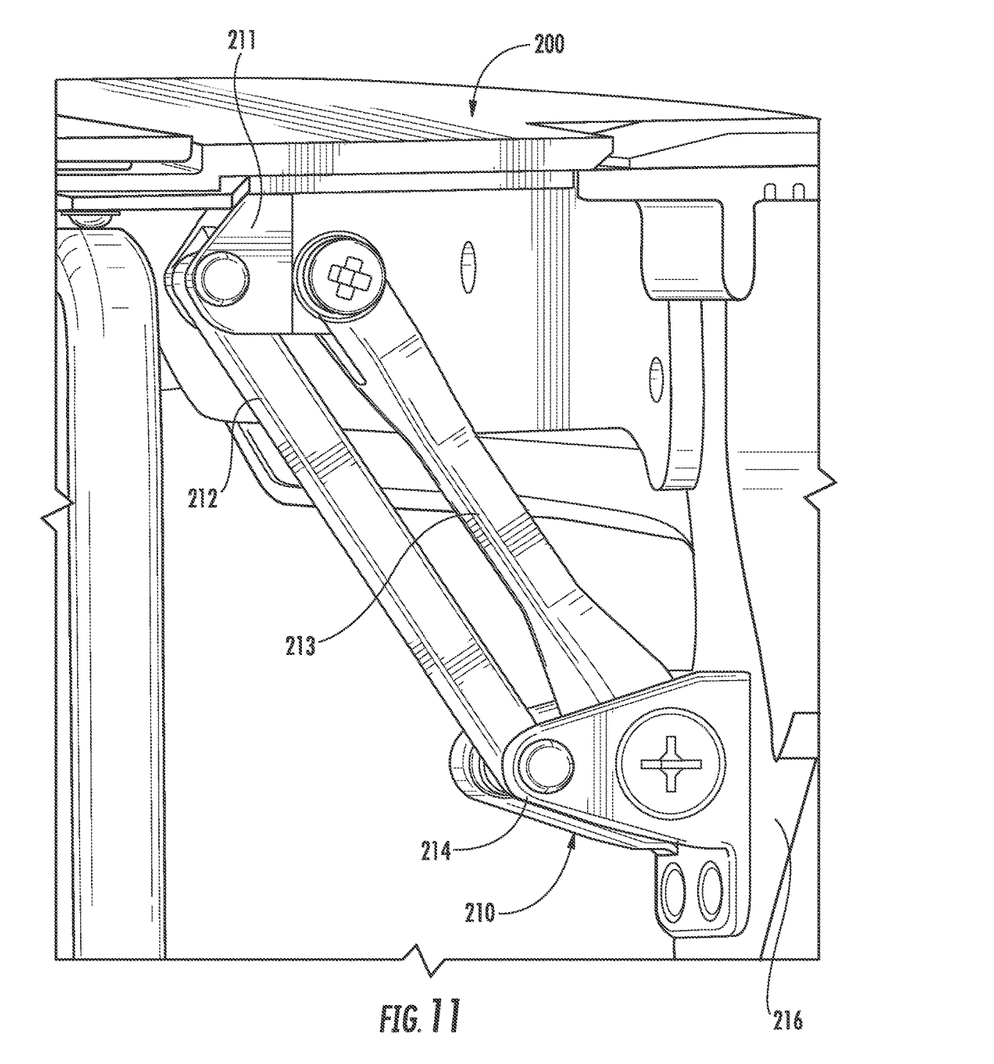
FIG. 11 is a perspective view of an armrest opening mechanism in a closed position, according to certain embodiments of the present invention.

In some embodiments of the present invention, as shown in FIGS. 10 and 11, the armrest door opening mechanism may comprise a parallelogram linkage 210. FIGS. 10 and 11 show the parallelogram linkage 210 and the armrest door 200 in open and closed positions, respectively. The parallelogram linkage 210 may comprise an upper link 211, a first vertical link 212, a second vertical link 213, and a lower link 214. The parallelogram linkage 210 may be assembled with any number of components that allow for rotation of the respective links around their joints. For example, each of the links of the parallelogram linkage 210 may be assembled using screws, pins, bolts, rivets, or other fasteners which support rotational movement.

Still referring to FIGS. 10 and 11, the upper link 211 is coupled to the armrest door 200 and the lower link 214 is coupled to the seat frame 216 or other stable structure. In the closed position of FIG. 11, the first and second vertical links 212, 213 are rotated away from their vertical orientation. The rotation of the first and second vertical links 212, 213 cause the armrest door 200 to be displaced laterally and vertically downward to close the armrest door 200. In other words, the parallelogram is substantially rectangular-shaped in the open position, and substantially angled in the closed position, where the vertical links 212, 213 may form an angle of approximately 57 degrees with the upper and lower links 211, 214. In certain embodiments, the vertical links 212, 213 may form an angle within the range of 45-65 degrees, or within the range of 50-60 degrees with the upper and lower links 211, 214 in the closed position. In yet other embodiments, the angle formed by the vertical links 212, 213 and the upper and lower links 211, 214 in the closed position may be any suitable angle. Said differently and by way of non-limiting example, in the open position, the angles of the joints or pivots of the parallelogram linkage 210 are substantially right angles in the open position and substantially acute or obtuse in the closed position. Throughout the range of motion, the upper link 211 and lower link 214 of the parallelogram linkage 210 remain substantially horizontal in orientation.

In the open position of FIG. 10, the first and second vertical links 212, 213 have been rotated into a vertical orientation. The rotation of the first and second vertical links 212, 213 displaces the upper link 211 in a lateral direction to translate the armrest door 200 laterally towards the open position. Simultaneously, the full length of the first and second vertical links 212, 213 are substantially aligned with the vertical direction, displacing the upper link 211 into a relatively higher position. This displacement provides some vertical movement to the armrest door 200 as it moves into the open position. The additional vertical displacement of the armrest door 200 may allow for extra clearance between the armrest door 200 and the console or armrest 1 (FIGS. 1-9), while also allowing for clearance between the armrest door 200 and the movement of the tray table as it moves from a stowed to a deployed position or vice versa. In some embodiments, the parallelogram linkage 210 may include bearings to provide smooth operation of the parallelogram linkage 210. In certain embodiments, the parallelogram linkage 210 may include spherical bearings at any joint of the parallelogram linkage 210 to allow rotation about multiple axes and provide some amount of extra articulation to the armrest door 200 as it moves from a closed to an open position or vice versa. In some embodiments, the parallelogram linkage 210 may be configured to provide a cam or cam-like locking action to retain the armrest door 200 in a closed position while not in use.

The parallelogram linkage 210 of FIGS. 10 and 11 provides one example of an armrest door opening mechanism. However, certain embodiments of the present invention may incorporate other components or armrest door opening mechanisms in combination with, or substitution of, the parallelogram linkage 210. For example, the armrest door 200 may use a slide or a roller and channel mechanism to provide the lateral translation of the armrest door 200. In some embodiments, the armrest door opening mechanism may incorporate a spring or spring-loaded components to retain, guide, or provide motion to the armrest door 200. In certain embodiments, the armrest door opening mechanism may include detents to provide stability to the armrest door 200 in its closed position, open position, or at any point along the motion of the armrest door between the open and closed positions. Some embodiments of the present invention may use electrical actuators, such as electric motors, solenoids, or other components, to open and close the armrest door 200. Furthermore, any number of latches or release mechanisms may be used to retain the armrest door 200 in a specified position, and then release it to allow the armrest door to move between the open and closed positions. Alternatively, in certain embodiments, the armrest door 200 may incorporate a pop-out release mechanism wherein pressing the armrest door 200 causes the mechanism to release and push the armrest door 200 into an unlocked position so that it may move between the open and closed positions. Similarly, the armrest door opening mechanism may comprise a spring which translates the armrest door 200 in a vertical direction while a slide guides the armrest door 200 along a lateral translation. In certain embodiments, the armrest door opening mechanism may include rubber bushings, bump stops, or other damping mechanisms to prevent noise, wear, or impact and slow the motion of the armrest door 200 as it nears open or closed positions. The armrest door opening mechanism may include any of the above described mechanisms or components separately or in combination with one another to move or guide the armrest door 200 between open and closed positions wherein the motion includes a lateral translation or a lateral translation in combination with a vertical translation.

Any of the above described components, parts, or embodiments may take on a range of shapes, sizes, or materials as necessary for a particular application of the described invention. The components, parts, or mechanisms of the described invention may be made of any materials selected for the suitability in use, cost, or ease of manufacturing. Materials including, but not limited to aluminum, stainless steel, fiber reinforced plastics, composites, polycarbonate, polypropylene, other metallic materials, or other polymers may be used to form any of the above described components.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A passenger seat comprising:
    an armrest;
    an armrest door; and
    an armrest door opening mechanism comprising a parallelogram linkage, wherein: the parallelogram linkage comprises a first vertical link and a second vertical link;
    the armrest door opening mechanism moves the armrest door between an open position and a closed position;
    the movement between the open position and the closed position comprises a lateral translation of the armrest door; and
    the armrest door maintains a substantially horizontal orientation during the movement between the open position and the closed position.

2. The passenger seat of claim 1, wherein the armrest comprises a tray table moveable from a stowed position to a deployed position when the armrest door is in the open position.

3. The passenger seat of claim 1, wherein the armrest is a console.

4. The passenger seat of claim 1, wherein the first vertical link and the second vertical link remain substantially parallel with one another during the movement of the armrest door.

5. The passenger seat of claim 1, wherein the movement between the open position and the closed position comprises (i) the lateral translation and (ii) a vertical translation of the armrest door.

6. The passenger seat of claim 1, wherein the parallelogram linkage further comprises:
an upper link attached to an upper end of the first vertical link and an upper end of the second vertical link; and
a lower link attached to a lower end of the first vertical link and a lower end of the second vertical link.

7. The passenger seat of claim 1, wherein an upper surface of the armrest door comprises an integrated cocktail tray, the integrated cocktail tray comprising:
a cocktail tray depression; and
a cocktail tray lip.

8. The passenger seat of claim 1, wherein the armrest door further comprises a finger aperture.

9. An armrest comprising:
an armrest door; and
an armrest door opening mechanism comprising a parallelogram linkage, wherein: the armrest door maintains a substantially horizontally orientation during movement;
the parallelogram linkage comprises a first vertical link, a second vertical link, an upper link, and a lower link;
the parallelogram linkage defines the movement of the armrest door; and
the movement comprises a lateral translation.

10. The armrest of claim 9, wherein:
the armrest door comprises an open position and a closed position such that the movement of the armrest door occurs between the open position and the closed position; and
the first vertical link and the second vertical link are substantially parallel to one another and are substantially vertical when the armrest door is in the open position.

11. The armrest of claim 10, wherein the first vertical link and the second vertical link are substantially parallel to one another and are substantially oblique relative to vertical when the armrest door is in the closed position.

12. The armrest of claim 9, wherein the armrest is a console.

13. The armrest of claim 9, wherein the movement of the armrest door comprises (i) the lateral translation and (ii) a vertical translation.

14. The armrest of claim 9, wherein the lower link is attached to a seat frame.

15. The armrest of claim 9, wherein the armrest door comprises a finger aperture.

16. The armrest of claim 9, wherein the upper link is attached to a bottom surface of the armrest door.

17. The armrest of claim 9, wherein:
the upper link is attached to an upper end of the first vertical link and an upper end of the second vertical link; and
the lower link is attached to a lower end of the first vertical link and a lower end of the second vertical link.

18. The armrest of claim 9, wherein an upper surface of the armrest door comprises an integrated cocktail tray, the integrated cocktail tray comprising:
a cocktail tray depression; and
a cocktail tray lip.

* * * * *